Patented Mar. 17, 1936

2,034,656

UNITED STATES PATENT OFFICE 2,034,656

PROTECTIVE COMPOSITIONS

Ernest R. Hanson, Bloomfield, N. J., assignor to Halowax Corporation, New York, N. Y., a corporation of Delaware No Drawing. Application May 12, 1932, Serial No. 610,989

5 Claims. (Cl. 134—17)

This invention relates to protective compositions particularly those characterized by resistance to both fire and water and suitable as insulation for wires, cables, etc. or for the impregnation or coating of textiles, paper and other fibrous materials.

Fireproofing agents of recognized value are the halogenated cyclic hydrocarbons such as benzene, naphthalene, diphenyl, anthracene, and their homologs and derivatives together with acenaphthene, etc; in particular the chlorinated naphthalenes have found commercial importance. It has been proposed that rubber be modified by the inclusion of such agents, particularly chlorinated naphthalenes, to thereby reduce inflammability of the rubber and obtain other useful properties, either by mechanical mixing or mastication or by the use of solvents. But these methods are open to objection; mechanical mixing does not give a sufficiently intimate mixture, resulting in a structurally weak and porous coating or film, and solvents are costly and remain more or less in the composition with possible harmful effects as well as involving the steps of adding and later recovering them.

I have discovered, however, that compositions can be prepared from the two ingredients, halogenated cyclic hydrocarbons and rubber or the like, in sufficiently intimate admixture to yield durable and satisfactory films or coatings and other articles without the use of solvents, provided these ingredients be reduced to the form of dispersions, that is, either as suspensions of solids or emulsions of liquids, but preferably as emulsions at the time of preparation. By the terms "dispersion" and "emulsion" I mean an intimate homogeneous mixture of discrete particles of small size in a non-solvent as distinguished from a solution where molecules are held in a solvent. By this means it is possible to secure a substantially colloidal dispersion of one ingredient in the other, as the halogenated hydrocarbon dispersed in the rubber. The association of the ingredients is so intimate that the resulting composition is characterized by excellent fire and water resistance.

The resulting dispersions are excellent "dopes" for fabric airplane wings; the water shrinks and tightens the fabric and upon evaporation leaves a water-proof and fire-resistant coating that is light in weight, smooth, strong, yieldable and non-cracking. They can also be used as paints or paint bases particularly for undercoats as they spread well and are applicable to wood or metal; suitable colors can be included to form finish coats. They are furthermore useful as impregnating or coating compositions for fibrous sheets or boards or mixing with fillers, etc. and thereafter dehydrated to give moldable compositions.

By the addition of a coagulant or precipitant, the compositions can be separated in the form of a coagulated rubbery mass which can thereafter be rolled, vulcanized, applied to wire, etc. mixed with various fillers, pigments, etc. or otherwise treated as is usual with rubber compositions. The mass is flexible, elastic and tough as well as fire and water resistant and is non-porous even in thin films. The colloidal dispersion of the halogenated hydrocarbon in the rubber permits vulcanization without material separation. Because of this fact it is useful for the manufacture of hard rubber articles, and these articles may have a high rubber content and yet be flame-resistant.

As the rubber component, rubber brought into an emulsified form but preferably in the form of rubber latex is used. Rubber substitutes can also be utilized such as balata, gutta percha, or synthetic preparations.

The halogenated cyclic hydrocarbons can range from syrupy liquids to solid wax-like materials. Preferably the halogenation should be restricted to give products melting below the boiling point of water so that emulsions in hot water can be formed from them. For chlorinated naphthalenes this requirement indicates a chlorine content up to 35 to 50 per cent by weight. High melting point products can have low melting point products or solvents included in them so as to lower the melting point to within the desired range.

For forming the dispersions of the halogenated hydrocarbon various stabilizing agents can be included such as an ethanolamine (mono, di or tri) together with an acid as oleic or stearic acid, ammonium linoleate and other soaps, bentonite, gum arabic, cornstarch, Montan wax made basic, casein, etc. These agents are introduced into the water (or other liquid) and the molten or liquid halogenated hydrocarbon stirred in; the water is preferably hot enough to maintain the hydrocarbon in the liquid form while being mixed. Other ingredients such as fillers, pigments, vulcanizing agents, etc. can be added during the mixing operation of a halogenated hydrocarbon dispersion with rubber latex or other rubber dispersion. Vulcanizing agents, however, are preferably added just prior to use of the emulsions or dispersions.

Coagulation or precipitation of the dispersion can be accomplished by evaporation of the liquid or by means of a coagulant such as acetic acid. Other suitable coagulants are formaldehyde, acids generally, salts, oxides or sulfides, of metals like lead, antimony, magnesium, zinc or their mixtures, etc.

A specific example illustrative of the invention is here appended, but it is to be understood that the invention is not restricted thereto.

*Example.*—Normally solid chlorinated naphthalene with about 40 percent chlorine content and melting at about 85° C. is fused, and stearic acid is incorporated to about 10 per cent by weight of the naphthalene product. The fused mass is then added with stirring to about twice its weight of hot water containing about 5 percent of triethanolamine based on the weight of the hydrocarbon. An emulsion is thereby formed which remains stable when cooled and miscible with further amounts of water. The dispersion thus obtained is then incorporated with rubber latex or other rubber dispersion previously formed by stirring one into the other or in any other suitable manner. These can be mixed in any proportions, but about equal parts by weight give a composition that is satisfactory for the uses contemplated. Both emulsions or dispersions remain stable during the mixing and they are capable of further dilution with water. They are coagulated by the addition of acetic acid or by evaporation of the water or other liquid in which they are suspended. When precipitated with acetic acid, it is found that the halogenated hydrocarbon is distributed as colloidal particles in the coagulated rubber, and no separation occurs at vulcanization temperatures. The product while having the characteristics commonly associated with rubber is likewise flame-proof, thereby extending the utility of rubber to a very marked degree.

The proportions of ingredients as well as the ingredients themselves can be changed from those set forth in the preceding example. For instance the percentage of stabilizing agent included can be decreased or increased from that stated and there is no definite limit as to the amount of water except as the applications of the dispersion may dictate. In place of chlorinated naphthalenes, other halogenated naphthalenes ranging from mono to hepta or their mixtures and other halogenated cyclic hydrocarbons, such as those of benzene and diphenyl, can be substituted. Chlorinated benzenes and diphenyls for instance that are suitable range from the mono to the fully chlorinated products; the proportions and selection of stabilizing agents and water are determined by the degree of stability demanded and the contemplated applications to be made of them. Likewise the oxidized products obtained from halogenated cyclic hydrocarbons are suitable for the production of fire and water resistant compositions.

Besides the uses and applications heretofore given, the composite dispersions of halogenated cyclic hydrocarbons and rubber or the like made in accordance with the present invention are capable of many others as will suggest themselves to those familiar with the art. The appended claims are therefore to be construed with a breadth commensurate with this disclosure; the term rubber for instance is inclusive of the rubber substitutes mentioned and halogenated cyclic hydrocarbons include the oxidized products obtained from them.

I claim:

1. Composition comprising a dispersion of a non-inflammable chlorinated benzene and rubber latex.

2. Non-inflammable composition comprising a dispersion of rubber and halogenated diphenyl, said diphenyl containing not less than 35 per cent of halogen.

3. Non-inflammable composition comprising a dispersion of rubber and non-inflammable halogenated diphenyl.

4. Method of preparing compositions which comprises dispersing a non-inflammable compound of the group consisting of halogenated benzene and diphenyl with a non-solvent liquid in a dispersion of rubber.

5. Method of preparing compositions which comprises forming a dispersion of a non-inflammable compound of the group consisting of halogenated benzene and diphenyl in a non-solvent liquid and mixing the dispersion with a dispersion of rubber.

ERNEST R. HANSON.